Sept. 15, 1959
D. E. BOWN ET AL
2,904,486
ELECTRICAL REDUCTION PROCESS
Filed July 19, 1957
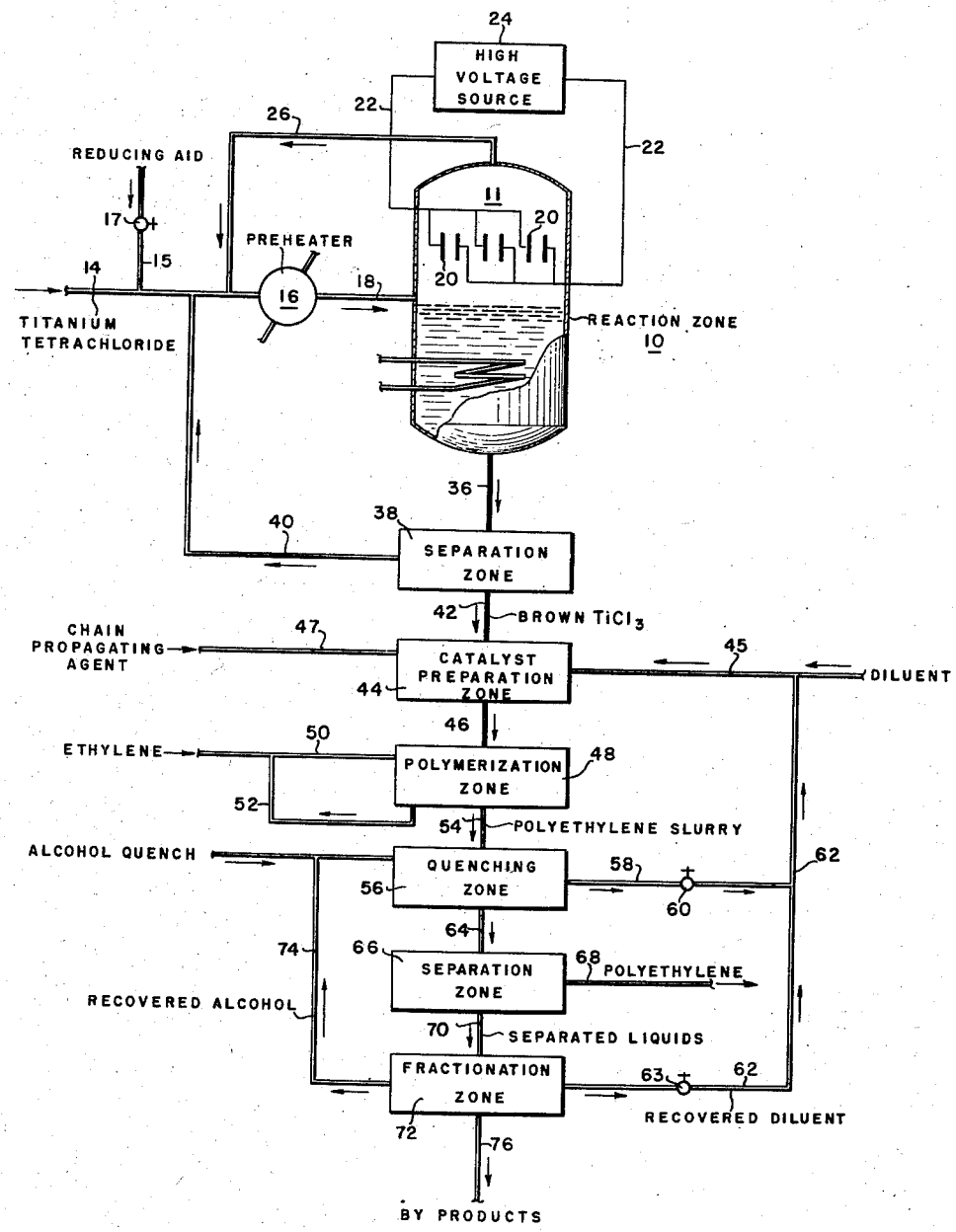
INVENTORS.
DELOS E. BOWN,
JAMES P. KELLER,
BY   ALBERT T. WATSON,
ATTORNEY.

United States Patent Office 2,904,486
Patented Sept. 15, 1959

2,904,486
ELECTRICAL REDUCTION PROCESS

Delos E. Bown, James P. Keller, and Albert T. Watson, Baytown, Tex., assignors, by mesne assignments, to Esso Research and Engineering Company, Elizabeth, N.J., a corporation of Delaware Application July 19, 1957, Serial No. 672,987

12 Claims. (Cl. 204—164)

This invention relates to the reduction of titanium tetrachloride. More particularly, the present invention is directed to a gas phase reduction of titanium tetrachloride to a stable form of brown titanium trichloride.

When titanium tetrachloride is reduced to titanium trichloride, the titanium trichloride product that is obtained may exist in a variety of structures of superficially the same chemical composition, the structure being dependent in large part on the reduction method employed. The most common reduction product is a violet or purple colored titanium trichloride solid which appears to be the more stable form of reduction product. In some situations, the initial reduction product that is obtained will be of a brownish color. For reasons that are unknown but which are believed to be associated with crystal structure, the brown form of titanium trichloride exhibits a catalytic activity which is different from the catalytic activity exhibited by the stable purple form of titanium trichloride. Thus, ethylene may be polymerized in the presence of activated brown titanium trichloride under mild conditions whereas more severe polymerization conditions are required with purple titanium trichloride.

The brown form of titanium trichloride is characterized by a relative instability and a tendency to be transformed into the more stable purple form. A comparatively stable brown form of titanium trichloride may be obtained by reducing titanium tetrachloride with an aluminum alkyl such as diethyl aluminum chloride. This material is particularly valuable as a catalyst component for the low temperature polymerization of ethylene. However, aluminum alkyls are expensive reagents, are difficult to handle, and are spontaneously flammable in air. A more inexpensive and a safer means for obtaining a stable form of the brown titanium trichloride is therefore desirable.

It has now been discovered that a brown form of titanium trichloride possessing a surprising stability is obtainable by reducing titanium tetrachloride in vapor phase with an electrical arc having a voltage within the range of about 35,000 to 500,000, and preferably in the range of about 35,000 to about 250,000 volts at a temperature of less than about 120° C. Electrical arcs having a voltage within this range may be conveniently characterized as visible electric arcs.

The reduction process of the present invention is conducted in the absence of compounds such as water vapor, oxygen, etc. having substantial polarity. The reduction is conducted in the vapor phase in an atmosphere containing titanium tetrachloride vapor. Suitable gaseous mediums include atmospheres consisting essentially of titanium tetrachloride, atmospheres of gaseous mixtures of titanium tetrachloride with inert gases such as nitrogen, and gaseous mixtures of titanium tetrachloride with non-polar reducing aids such as hydrogen, normally gaseous $C_1$ to $C_{12}$ paraffinic hydrocarbons, etc. The yield of the stable brown form of titanium trichloride is maximized when the atmosphere is saturated with titanium tetrachloride.

The temperature employed in conducting the reduction process should be less than about 120° C. At temperatures of more than about 120° C. a purple form of titanium is formed. The reduction temperature is preferably within the range of about 0° to 50° C. The reduction is conveniently conducted at atmospheric temperature.

When the voltage of the electric arc is within the range of about 35,000 to 80,000 volts, a reducing aid such as hydrogen or a $C_1$ to $C_{12}$ straight chain paraffinic hydrocarbon (e.g., methane, ethane, heptane, dodecane, etc.) should preferably be employed. At higher voltages within the range of about 80,000 to 250,000 volts, no particular advantage is obtained by employing a reducing agent.

In accordance with a preferred form of the present invention, a liquid body consisting of titanium tetrachloride or a mixture of liquid titanium tetrachloride with a liquid saturated straight chain hydrocarbon is provided as a collecting medium for the titanium trichloride product in order to provide for a high surface area, small particle size product.

The invention will be further illustrated in connection with the accompanying drawing which is a schematic flow sheet illustrating a preferred embodiment of the present invention.

Turning now to the drawing, there is provided a reaction zone 10 containing a vapor space 11 and, in the bottom portion thereof, a liquid body 12 which, for purposes of illustration, may be considered to consist of titanium tetrachloride. Titanium tetrachloride to be reduced is introduced to the system by way of a charge line 14 leading to a preheater 16 wherein the titanium tetrachloride is volatilized. When desired, a reducing aid such as hydrogen, methane, n-heptane, etc. may also be introduced by way of a branch line 15 controlled by a valve 17. Vaporized titanium tetrachloride is introduced into the vapor space 11 of reaction zone 10 above the body of liquid 12 by way of a charge line 18 and there brought into contact with an electric arc having a voltage within the range of about 35,000 to 500,000 generated between electrodes 20, the arc being generated by means of an electrical current flowing through electrical connections 22—22 interconnecting the electrodes 20 with a suitable high voltage source 24 which may be an alternating current high voltage source or a direct current high voltage source. Reduction of at least a portion of the vaporized titanium tetrachloride occurs within the reactor 10 and the brown reduced titanium trichloride formed by the reduction collects in the form of solid small particles of high surface area in the liquid body of titanium tetrachloride 12. Unreacted vaporized titanium tetrachloride is withdrawn from the reactor 10 by way of a recycle line 26 leading to the titanium tetrachloride line 14.

As a consequence, therefore, a slurry of particulate brown titanium trichloride in liquid titanium tetrachloride is formed in the liquid body 12 of the reactor 10. The slurry is charged by way of a line 36 to a suitable separation zone 38 wherein the liquid titanium tetrachloride is separated from the solid brown titanium trichloride reduction product. If desired, the liquid titanium tetrachloride may be recycled to the charge line 14 by way of the recycle line 40.

The reduction product of the present invention finds particular utility as a component for use in the preparation of an ethylene polymerization catalyst.

When an ethylene polymerization catalyst is to be prepared, the solid reduction product is discharged from the zone 38 by way of a conduit 42 leading to a suitable catalyst preparation zone 44 wherein the reduction product is admixed with a suitable organic diluent such as a $C_6$ to $C_{12}$ paraffinic hydrocarbon (e.g., hexane, heptane, etc.), an aromatic hydrocarbon such as benzene, a halogenated hydrocarbon such as chlorobenzene, dichlorobenzene, fluorobenzene, etc., or a mixture of two or more such suitable diluent compounds. The diluent is charged to the catalyst preparation zone by way of a line 45. A chain propagating agent is also charged to the catalyst preparation zone 44, the chain propagating agent being introduced by way of the line 47.

Representative of the chain propagating agents that may be employed are reducing metal-containing materials such as alkali and alkaline earth metals, their alloys, their hydrides and their alkyl or aryl compounds such as, for example, mixtures of sodium hydride with boron, magnesium aluminum alloys, lithium butyl, etc. Preferred chain propagating agents include aluminum alkyls such as triethyl aluminum, tripropyl aluminum, triisopropyl aluminum, diethyl aluminum halides, such as diethyl aluminum chloride, di-isobuytl aluminum chloride, diaryl aluminum halides, etc. A particularly preferred class of propagating agents includes diethyl aluminum chloride, triethyl aluminum chloride, or a mixture of diethyl aluminum chloride with triethyl aluminum chloride. From about 0.03 to 5 (preferably from about 1 to 3) mols of chain propagating agent per mol of titanium trichloride should be employed. The amount of diluent is preferably such that the final catalyst composition contains from about 0.01 to about 1 weight percent of titanium trichloride-chain propagating agent mixture.

The resultant catalyst composition is discharged from the catalyst preparation zone 44 by way of a line 46 leading to an ethylene polymerization zone 48 wherein ethylene charged thereto by way of a line 50 is polymerized to form solid high molecular weight polyethylene. The ethylene polymerization is conducted under polymerization conditions including, for example, a polymerization temperature within the range of about 50° to 200° F. and a polymerization pressure within the range of about 0 to 500 p.s.i.g.

Unreacted ethylene is preferably recycled to the olefin charge line 50 by way of recycle line 52 and a slurry of polymerized ethylene in the diluent is discharged from the zone 48 by way of a line 54 leading to a quenching zone 56.

In the quenching zone 56 the entire slurry may be quenched with a suitable quenching material such as an aliphatic alcohol to solubilize co-catalyst components. Alternately, the polymerized olefin may be separated from the diluent in the quenching zone 56 in which case only the solid polymer-containing product will be subjected to a quenching operation. In this latter case, the separated diluent may be charged by way of a branch line 58 controlled by a valve 60 leading to a recycle line 62 connected with the diluent charge line 45. In this situation, further, the quenched polyolefin may be recovered from the quenching compound by any suitable manipulative procedure such as centrifugation, filtration, etc.

Alternately, and as shown in the drawing, the entire polyolefin slurry is quenched and the quenched product discharged from the quenching zone 56 by way of a line 64 leading to a separation zone 66 wherein the polyethylene is separated from the liquid components of the charge by any suitable means such as centrifugation, filtration, etc. to recover a polyethylene product which is discharged by way of a line 68 and a separated liquids fraction which is discharged by way of a line 70 leading to a fractionation zone 72. Within fractionation zone 72 the separated liquids may be fractionated to provide a recycle diluent fraction recycled to the diluent charge line 45 by opening valve 63 in line 62, an alcohol fracton recycled to the alcohol quench line 55 by way of a recycle line 74 and a by-products liquids fraction by way of the line 76.

The present invention will be further illustrated by the following specific example which is given by way of illustration and not as a limitation on the scope of this invention.

*Example I*

A brown stable form of titanium trichloride is prepared at room temperature and atmospheric pressure employing an electric arc having a voltage of about 35,000 volts A.C. generated with a high voltage Tessler coil by arranging the electrodes so as to give the desired spark at a distance of about 1 centimeter above a body of liquid titanium tetrachloride in a reaction vessel in an atmosphere consisting of hydrogen and titanium tetrachloride and saturated with vaporized titanium tetrachloride.

What is claimed is:

1. A process for preparing a stable form of brown titanium trichloride which comprises reducing vaporized titanium tetrachloride in the presence of an electric arc having a voltage within the range of about 35,000 to 500,000 volts at a temperature of less than about 120° C., said titanium tetrachloride being reduced in the absence of compounds having substantial polarity.

2. A process as in claim 1 wherein the reduction is conducted at a temperature within the range of about 0° to 50° C.

3. A process as in claim 2 wherein a reducing agent is also present.

4. A process as in claim 3 wherein the reducing agent is hydrogen.

5. A process as in claim 3 wherein the reducing agent is a $C_1$ to $C_{12}$ paraffinic hydrocarbon.

6. A process for preparing a stable brown form of titanium trichloride which comprises the steps of establishing a vaporized titanium tetrachloride-containing atmosphere above a liquid body of titanium tetrachloride, generating an electric arc having a voltage within the range of about 35,000 to 250,000 in the said vapor space to reduce at least a portion of the titanium tetrachloride to brown stable titanium trichloride and collecting the brown stable titanium trichloride in said body of liquid titanium tetrachloride, said titanium tetrachloride being reduced in the absence of compounds having substantial polarity and at a temperature within the range of about 0° to about 120° C.

7. A process as in claim 6 wherein the said atmosphere is saturated with titanium tetrachloride vapor.

8. A process as in claim 7 wherein the voltage is within the range of about 35,000 to 80,000 and a reducing aid is present in said atmosphere.

9. A process as in claim 8 wherein the reducing agent is hydrogen.

10. A process as in claim 8 wherein the reducing agent is a $C_1$ to $C_{12}$ paraffinic hydrocarbon.

11. A process for preparing a stable brown form of titanium trichloride which comprises the steps of establishing an atmosphere above a liquid body of titanium tetrachloride saturated with vaporized titanium tetrachloride and containing a reducing agent selected from the group consisting of hydrogen and $C_1$ to $C_{12}$ paraffinic hydrocarbons, generating an electric arc having a voltage within the range of about 35,000 to 250,000 in the said vapor space to reduce at least a portion of the titanium tetrachloride to brown stable titanium trichloride and collecting the brown stable titanium trichloride in said body of liquid titanium tetrachloride, said titanium tetrachloride being reduced in the absence of compounds having substantial polarity and at a temperature within the range of about 0° to about 120° C.

12. A process as in claim 11 wherein the reducing agent is hydrogen, wherein the titanium tetrachloride is reduced at a temperature within the range of about 0° to 50° C.

and wherein the voltage is within the range of about 35,000 to about 80,000.

References Cited in the file of this patent

UNITED STATES PATENTS

| | | |
|---|---|---|
| 1,046,043 | Weintraub | Dec. 3, 1912 |
| 2,724,692 | Akerlof | Nov. 22, 1955 |
| 2,854,392 | Tokumoto et al. | Sept. 30, 1958 |
| 2,860,094 | Ishizuka | Nov. 11, 1958 |

OTHER REFERENCES

Bock et al.: Monatshefte Chemie, vol. 33 (1912), pages 1407–1429.